United States Patent [19]

Prader et al.

[11] Patent Number: 4,812,055
[45] Date of Patent: Mar. 14, 1989

[54] THERMOPLASTIC BAG AND METHOD OF FORMING THE SAME

[75] Inventors: Randolph D. Prader, Fairport; Gordon L. Benoit, Victor, both of N.Y.

[73] Assignee: Mobil Oil Corporation, New York, N.Y.

[21] Appl. No.: 139,215

[22] Filed: Dec. 29, 1987

[51] Int. Cl.$^4$ .............................................. B65D 33/02
[52] U.S. Cl. ..................................... 383/119; 383/120; 383/903
[58] Field of Search ................... 383/2, 8, 17, 18, 119, 383/120, 121, 903

[56] References Cited

U.S. PATENT DOCUMENTS

| | | | |
|---|---|---|---|
| 3,143,277 | 8/1964 | La Fleur | 383/119 |
| 3,381,886 | 5/1968 | Goglio | 383/121 |
| 4,165,832 | 8/1979 | Kuklies et al. | 383/8 |
| 4,554,192 | 11/1985 | Benoit | 428/35 |
| 4,588,392 | 5/1986 | Maddock | 383/8 X |
| 4,597,103 | 6/1986 | Hoover | 383/120 |
| 4,613,988 | 9/1986 | Maddock | 383/8 |
| 4,676,378 | 6/1987 | Baxley et al. | 383/8 X |
| 4,720,872 | 1/1988 | Kaczerwaski | 383/8 |

OTHER PUBLICATIONS

U.S. application Ser. No. 45,642 filed 5/4/87 (new serial number to be issued for file wrapper continuation filed with PTO Feb. 12, 1988).

*Primary Examiner*—Stephen Marcus
*Assistant Examiner*—Nova Stucker
*Attorney, Agent, or Firm*—Alexander J. McKillop; Charles J. Speciale; James P. O'Sullivan, Sr.

[57] ABSTRACT

A thermal plastic film bag structure having front and rear walls, gusseted side walls and a sealed bottom. This bag which has a tendency to form holes in the bottom at the seal transition point between the four layers of the gusset and the two layers of the central region of the bag is improved by providing seal areas, e.g. circular seals which are located slightly above the bottom seal line and slightly inside of the vertical line formed by the innermost reach of the gussets on both sides of the bag. The seal areas relieve strain at the weak regions in the bottom of the bag.

4 Claims, 1 Drawing Sheet

PRESENT INVENTION

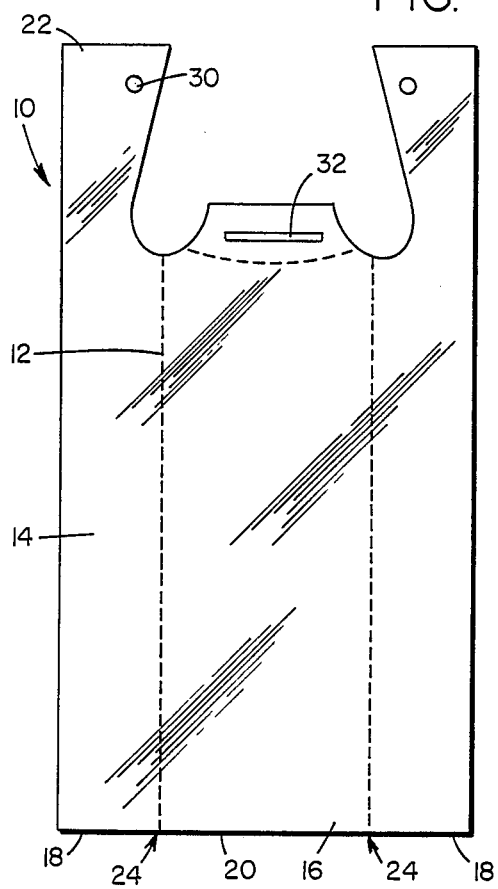
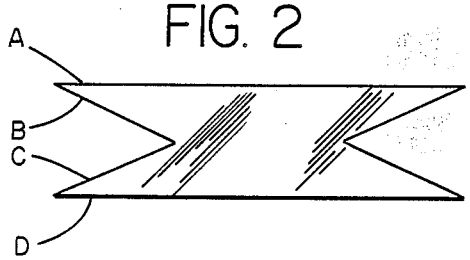
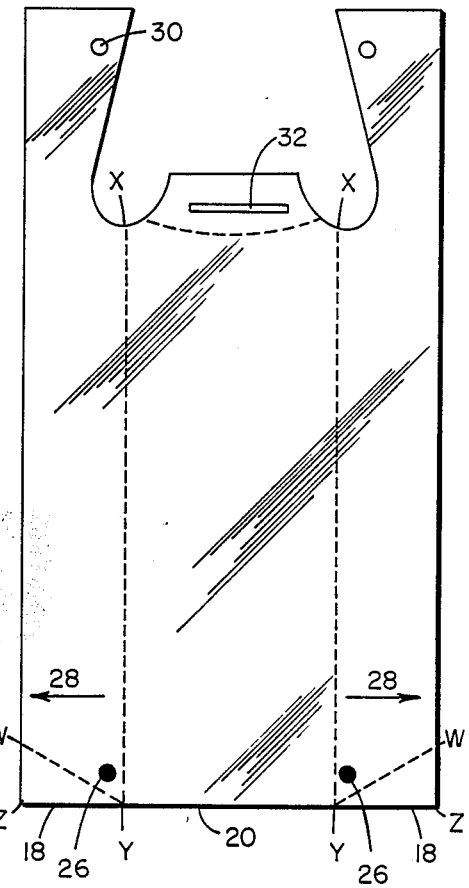

THERMOPLASTIC BAG AND METHOD OF FORMING THE SAME

The present invention relates to a handled thermoplastic bag structure and a method for forming the same.

The structure of thermoplastic grocery sacks has in recent years evolved to that of a structure made by: collapsing a tube of plastic so as to have two in-folded pleats or gussets at opposite sides thereof; forming two spaced seals positioned transverse of the collapsed tube; and removing from one end thereof of a U-shaped segment which simultaneously forms two integral handles and a bag mouth opening. By this configuration and by virtue of the in-folded pleats or gussets the handles have double film thicknesses which give greater carrying strength in the handles. A forerunner of this bag has been referred to as an "undershirt" type bag, since the upper portion of the bag and handles resembles an undershirt.

Bags of these structures had a tendency to split or tear in the bag mouth opening as handles were stretched during the bag loading process. This problem was successfully solved by including stress relief structures in the bag mouth opening in the region near the base of the handles; see U.S. Pat. No. 4,165,832, the disclosure of which is, in its entirety, incorporated herein by reference.

With the increasing use of such thermoplastic handle sacks in conjunction with the down-gauging trend regarding the thickness of the thermoplastic film employed therein, a problem has developed which threatens to undermine the consumer's confidence in such thermoplastic sacks. At the bottom of the above-described sacks, a heat seal stripe forms a welded closure for the bag structure. In the region of the in-folded pleat or gusset, four layers of film are brought together in the outer regions of the lay-flat bag structure and, in-between, two layers of the front and back panels of the sack are brought together. Thus, the heat seal must simultaneously weld four layers together in the outboard segments of the sack in its lay-flat condition and two layers together at the central region of the sack. It has been found that bags have been failing by tearing open in the region of the heat seal portion of the bottom of the sack beginning at the seal transition from the four layers to the two layers. One attempt to solve this problem is shown in U.S. Pat. No. 4,613,988, which is incorporated herein in its entirety.

It is an object of this invention to present another solution to this problem.

SUMMARY OF THE INVENTION

The present invention is concerned with a plastic film sack which has outer front and rear walls and gusseted side walls. In the bottom of said sack, a transverse hat-seal stripe welds together the four film layers in the gusseted regions of the sack and the two film layers between said gusseted regions. This bag has area seals, each located a spaced distance from said transverse seal and a spaced distance from the innermost gusset folds on each side of said bag. These area seals are seals between the outerwalls and the gusseted walls, said area seals being located so as to relieve stress on expansion of said gussets at the seal region points where said transverse seal extends from the four film seal to the two film seal.

Stated otherwise, in a plastic film sack having gusseted side walls and a transverse heat-sealed bottom stripe welding together four film layers in the outer region of the bag bottom and two film layers in the center region of the bag bottom, the improvement comprising: the provision of stress-relief seal areas in the bottom of said sack, said seal areas functioning to relieve stress in the transverse bottom seal stripe at the points where the expanding gussets would be stressing said bottom seal.

In a more particular form of the present invention, the sack of thermoplastic film comprises: outer front and rear bag walls joined together by side walls, each side wall having a single integral pleat; an open mouth top portion having double film thickness handles which are integral extensions of said outer and side walls; at least one bottom heat-seal stripe welding together four film layers in both of the collapsed, lay-flat regions of said side walls and welding together the two bottom-central film layers of said outer walls; and adjacent to the transition point on the heat-seal stripes of the four film layers and the two film layers are stress relieving seal areas.

The method of forming the above described sacks comprises collapsing a tube of thermoplastic film while simultaneously forming gussets in opposite sides thereof and prior to or subsequent to forming the transverse heat-seal stripe or stripes for the bottom of the bag, forming a seal area adjacent to the 90° angle formed by the transverse seal line in the gusset region of the bottom of the bag and the vertical line formed by the innermost fold of the gusset. See angle XYZ of FIGS. 3. This seal area can be through the four films ABCD, see below, or through A bonded to B and C bonded to D, but no bond between B and C.

BRIEF DESCRIPTION OF THE DRAWINGS

FIG. 1 is a front elevation view representing a bag of the prior art.

FIG. 2 is an end view of a thermoplastic tube having oppositely disposed gussets in partially collapsed form.

FIG. 3 is a front elevation view of one form of the bag structure of the present invention.

DETAILED DESCRIPTION OF THE INVENTION

Referring to FIG. 1, 10 refers to a bag structure of the prior art. In forming this bag structure, a collapsed tubular thermoplastic film such as that depicted in FIG. 2 is employed. FIG. 2 shows an end view of such a tube having two oppositely disposed in-folded gussets represented by B and C. The front and the rear or the outer panels or walls of the bag derive from film A and film D of the collapsed tubular structure. The vertical dotted lines 12 of FIG. 1, illustrate the extent to which the gusset or pleat extends in from the side region of bag 10. In its fully lay-flat condition the outer segments of the bag constitute four layers of film as in the region 14. These four layers are shown in FIG. 2 is layers A, B, C and D. The same is true on the opposite side of the bag. The region 16 in FIG. 1 represents the central region of the sack made up of two films, i.e. the central regions of films A and D of FIG. 2. The region 18 of FIG. 1 represents a heat seal which extends in a transverse line or stripe across the bottom of the sack. At the opposite end of the sack, 22 represents the handles which are made of two separate film thicknesses by virtue of the gusset or pleat arrangement of the sack. Orifices 30 and 32 are alternative suspension holes or points for suspending packs of bags from appropriate racks in a supermarket checkout counter.

The two points 24 of FIG. 1 represent, an inherent weak spot in the heat-seal bond at the bottom of the bag. When the arrangement shown in FIG. 2 is completely collapsed, films A, B, C, and D, are essentially parallel. Thereafter, a sealing means transversely heat unitizes the layers. The melt-unitized mass in the outer regions of the bottom of the bag is thicker than that in the center region of the bag. When the bag is put to use and product begins filling the bag, the gussets or pleats 12 begin to unfold in an attempt to form the side walls of the sack. This readily occurs unimpeded from the mouth of the sack and throughout most of the bag. However, the bottom of the gusset 12 is prevented from expanding because it has been heat sealed between films A and D. As filling and stretching of the bag continues, the resistance at points 24 can be exceeded. This is particularly true in bags made of high molecular weight, high density polyethylene of a film gauge thickness between about 0.3 to about 1.0 mils. A tear develops in the thickness region corresponding to films A and D, just adjacent to the transition region extending from the fused four layers to the fused two layers at the bottom of the bag, i.e. at 24. Once such a tear begins, a zippering effect can cause the bottom of the bag to open with loss or partial loss of the contents thereof.

Referring to FIG. 3, it has been found that the strain or stress that tends to concentrate at region 24 of FIG. 1, can be relieved or transferred to seal areas 26 which can withstand the forces of loads for which the bag structure has been designed.

In FIG. 3 lines XY and YZ form right angles at the bottom of the bag. The seal area 26 should be located within the 90° angle so that when gusset fold lines XYZ move outward or pivot at point Y, the bottom region of gusset fold XY will contact seal area 26 and strain on point Y will be relieved. It is preferred that seal area 26 be spaced from line ZY and be closer to line XY than to ZY. Without being limited to a precisely stated range of locations, the seal area can be located from about 0-3 cm from line ZY and from about 0-3 cm from line XY. A particularly preferred location is that shown in FIG. 3 near the apex of angle XYW.

The configuration of the seal area is not important. It may be of any regular geometric figure, e.g., circle, triangle, square, or irregular figure, e.g, oval, star, etc. It also may be a series of short spaced seal lines. The seal area can be formed by heat, by adhesive or some mechanical means. If a circle, it can have a diameter of from about 0.3-1 cm and if some other shape, then of an equivalent area.

The seal area can be between film layers ABC and D for example by heat sealing through the four layers either before or after forming transverse seal line 18. The seal areas also may advantageously be between film layers A and B with a separate seal between C and D. In this embodiment B is not sealed to C and there are, therefor, four seal areas, two on each side of the bag. This arrangement provides for an even more efficient relief of stress as the gussetts expand.

The seal areas can be formed using conventionally heat source means, e.g., ultrasonic heads or resistance elements. Dots of adhesive may be used as alternative means.

While the contemplated sacks can be made of any thermoplastic material, polyethylene and polyethylene blends are preferred. The term polyethylene is employed herein in it generic sense to include low density polyethylene (LDPE) having a density of from about 0.910-0.939, linear low density polyethylene (LLDPE), which actually is a copolymer of ethylene and another alpha olefin, having a density ranging from about 0.910-0.939, high molecular weight, high density polyethylene (HDPE) having a density ranging from about 0.940-0.970 and any blends thereof. A preferred material for handled grocery sacks is a blend of LLDPE and LDPE with the latter being present in from about 0-20% by weight. When employing this material, the film gauge can range from about 0.3 to 1 mil in thickness. Another preferred polyethylene resin is high density polyethylene (HDPE) alone or in combination with from 0 to 50 weight % of LLDPE. A preferred combination is a blend of the two which would yield a density of from 0.945-0.955 g/cc. When material of this density is employed unusually strong film having a guage thickness of from 0.3 to 1 mil can be employed in forming the grocery sacks contemplated by the present invention.

What is claimed is:

1. A Thermoplastic film bag structure comprising front and rear outer walls connected by gusseted side walls and having an open mouth top portion with double film handles at opposite end regions of said mouth; said bag in its lay-flat condition having a bottom formed by a transverse seal extending across four film layers in the gusset regions and across two film layers in the region between gussets; said bag having area seals, each located a spaced distance from said transverse seal and a spaced distance from the innermost gusset folds on each side of said bag, said area seals being seals between the outer walls and the gusset walls, said area seals being located so as to relieve stress on expansion of said gussets at the seal region points where said transverse seal extends from the two-film seal to the four film seal.

2. The bag structure of claim 1 wherein said area seals seal all four of the film layers in the gusset regions.

3. The bag structure of claim 1 wherein the area seals seal the outer walls to a gusset wall without the gusset walls being sealed to each other.

4. The bag structure of claim 1 wherein said area seals are of an area sufficient to relieve stress on expansion of said gussets at the seal region points where said transverse seal extends from the two-film seal to the four-film seal.

* * * * *